(12) United States Patent
Tagawa

(10) Patent No.: US 9,363,397 B2
(45) Date of Patent: Jun. 7, 2016

(54) IMAGE READING DEVICE AND IMAGE FORMING APPARATUS

(71) Applicant: KYOCERA Document Solutions Inc., Osaka (JP)

(72) Inventor: Hirotoshi Tagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/921,599

(22) Filed: Oct. 23, 2015

(65) Prior Publication Data

US 2016/0127589 A1 May 5, 2016

(30) Foreign Application Priority Data

Oct. 29, 2014 (JP) .................................. 2014-220175

(51) Int. Cl.
*H04N 1/04* (2006.01)
*H04N 1/00* (2006.01)
*B65H 5/06* (2006.01)

(52) U.S. Cl.
CPC ........... *H04N 1/00588* (2013.01); *B65H 5/062* (2013.01); *H04N 1/00753* (2013.01); *H04N 1/00774* (2013.01); *H04N 1/00795* (2013.01); *H04N 1/04* (2013.01); *H04N 2201/0094* (2013.01)

(58) Field of Classification Search
None
See application file for complete search history.

(56) References Cited

U.S. PATENT DOCUMENTS

| 6,744,540 | B1 * | 6/2004 | Masuda | H04N 1/00681 250/208.1 |
| 6,873,728 | B2 * | 3/2005 | Bernstein | H04N 1/4097 348/246 |
| 7,619,785 | B2 * | 11/2009 | Sodeura | H04N 1/00002 358/461 |
| 7,889,393 | B2 * | 2/2011 | Yoshizawa | H04N 1/4097 358/1.9 |
| 8,018,631 | B2 * | 9/2011 | Kagami | H04N 1/00477 358/463 |
| 8,355,187 | B2 * | 1/2013 | Matsui | H04N 1/00002 358/474 |
| 2013/0170002 | A1 * | 7/2013 | Matsui | H04N 1/04 358/498 |

FOREIGN PATENT DOCUMENTS

JP  H 11-79512 A  9/1999

* cited by examiner

*Primary Examiner* — Dung Tran
(74) *Attorney, Agent, or Firm* — Stein IP, LLC

(57) ABSTRACT

An image processing portion determines that a black stripe is present when among a plurality of main scanning lines included in a back end side range from a last back end position of the reading image data in a sub-scanning direction to a predetermined position, a main scanning line in which a density value of a pixels in a predetermined position is higher than a first threshold density is present, sets, at a reference line, a main scanning line farthest from the last back end position among the main scanning lines in which the density value of the pixel in the predetermined position is higher than the first threshold density and replaces density values of all pixels included in a range from a position of the reference line in the sub-scanning direction to the last back end position with a density value corresponding to white.

8 Claims, 7 Drawing Sheets

IMAGE READING DEVICE AND IMAGE FORMING APPARATUS

INCORPORATION BY REFERENCE

The present application is based upon and claims the benefit of priority from the corresponding Japanese Patent Application No. 2014-220175 filed on Oct. 29, 2014, the entire contents of which are incorporated herein by reference.

BACKGROUND

The present disclosure relates to an image reading device that reads an original document to generate the image data of the original document and an image forming apparatus.

Conventionally, an image reading device is known that can perform transport and reading in which an original document is read while the original document is being transported. Such an image reading device includes an original document transport unit for transporting the original document.

For example, when the conventional image reading device performs the transport and reading, the image reading device moves a movement unit including a light source and a mirror below a contact glass for the transport and reading. The image reading device (the original document transport unit) transports the original document to a reading position on the contact glass for the transport and reading. Then, when an end of the original document reaches the reading position, the image reading device applies the light of the light source to the original document and forms an image on an image sensor with light reflected off the original document. In this way, the reflected light from the original document is photoelectrically converted to generate the image data of the original document.

SUMMARY

According to a first aspect of the present disclosure, an image reading device includes an original document transport unit, an image reading portion and an image processing portion. The original document transport unit transports an original document to a reading position in which the original document is read. The image reading portion includes a light source which is arranged on a downstream side in an original document transport direction with respect to the reading position when the original document is read in the reading position, applies light of the light source to the original document transported to the reading position and photoelectrically converts light reflected off the original document to generate image data of the original document. The image processing portion performs image processing on reading image data which is the image data of the original document obtained through reading of the original document by the image reading portion. The image processing portion determines that a black stripe that appears when a shadow produced on a side of a back end of the original document transported to the reading position is read by the image reading portion in the reading image data is present when among a plurality of main scanning lines included in a back end side range from a last back end position of the reading image data in a sub-scanning direction to a predetermined back end side position, a main scanning line in which a density value of a pixels in a predetermined position is higher than a first threshold density is present. When the image processing portion determines that the black stripe is present in the reading image data, the image processing portion sets, at a reference line, a main scanning line farthest from the last back end position among the main scanning lines within the back end side range in which the density value of the pixel in the predetermined position is higher than the first threshold density, and performs black stripe removal processing which replaces density values of all pixels included in a range from a position of the reference line in the sub-scanning direction to the last back end position with a density value corresponding to white.

According to a second aspect of the present disclosure, an image forming apparatus includes the image forming device.

DETAILED DESCRIPTION

An embodiment of the present disclosure will be described below using, as an example, a multifunctional machine that has a printer function, a copying function and the like.

<Overall Configuration of Multifunctional Machine>

Figure 1:
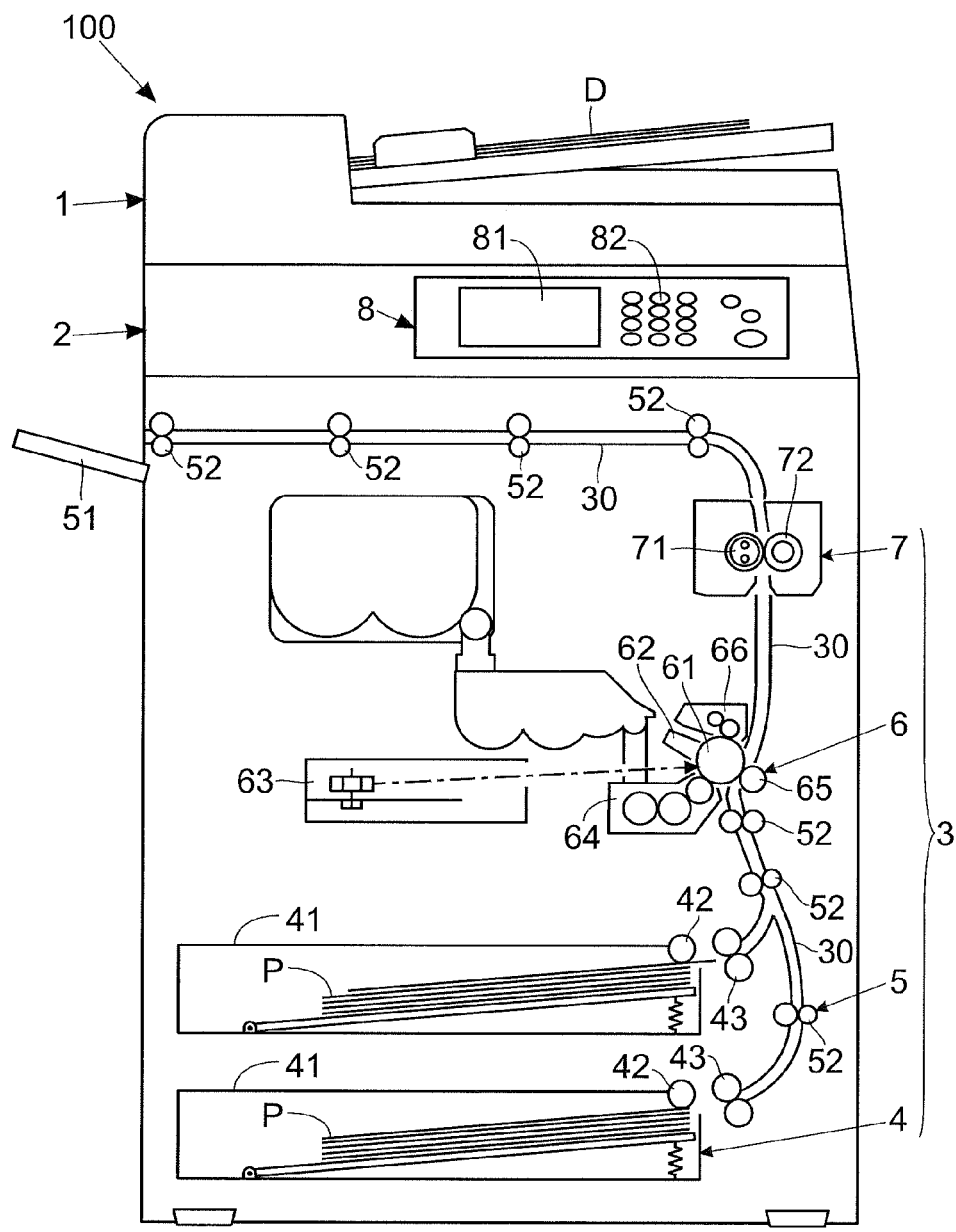
FIG. 1 is a schematic diagram of a multifunctional machine in an embodiment of the present disclosure.

As shown in FIG. 1, the multifunctional machine 100 of the present embodiment includes an image reading portion 2 to which an original document transport unit 1 is fitted, a print portion 3 (a paper feed portion 4, a sheet transport portion 5, an image formation portion 6 and a fixing portion 7) and an operation panel 8. The multifunctional machine 100 corresponds to an "image forming apparatus", and the image reading portion 2 corresponds to an "image reading device".

Figure 2:
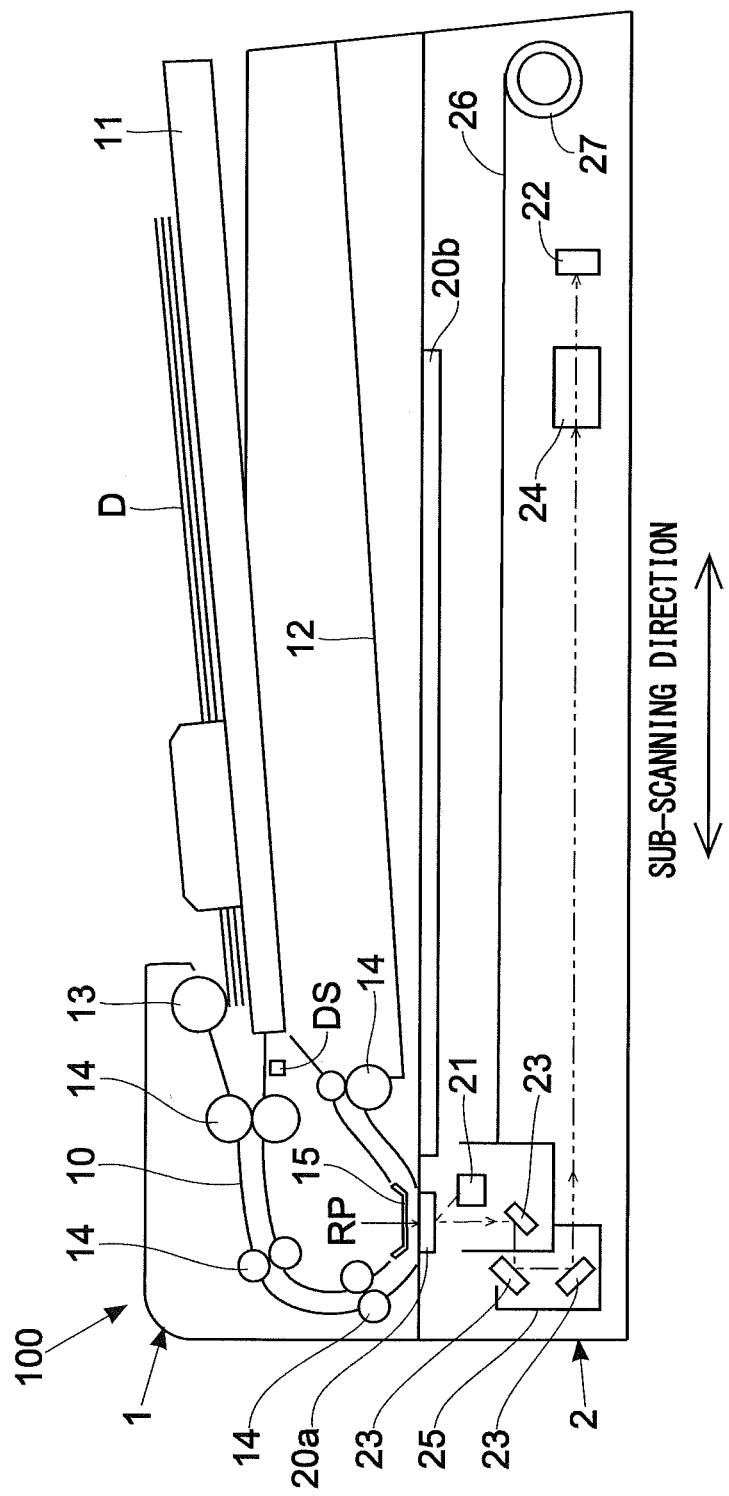
FIG. 2 is a schematic diagram of an image reading portion of the multifunctional machine in the embodiment of the present disclosure.

As shown in FIG. 2, the image reading portion 2 to which the original document transport unit 1 is fitted includes a frame (reading stage) into which a contact glass 20a for transport and reading and a contact glass 20b for placement and reading are fitted. The image reading portion 2 performs transport and reading in which an original document D passed on the contact glass 20a is read and placement and reading in which the original document D placed on the contact glass 20b is read.

The original document transport unit 1 is attached to the frame of the image reading portion 2 such that the original document transport unit 1 can be opened and closed (can be rotated). The original document D is transported onto the contact glass 20a by the original document transport unit 1. Specifically, the original document transport unit 1 includes an original document set tray 11, an original document ejection tray 12, a paper feed roller 13, transport roller pairs 14 and a white reference plate 15 (that corresponds to a "white plate"). In the original document transport unit 1, an original document transport path 10 is provided that reaches the original document ejection tray 12 from the original document set tray 11 through a position (hereinafter referred to as a reading position RP) on the contact glass 20a which is a reading position at the time of the transport and reading.

The original document set tray 11 is a tray on which the original document D before reading is set, and the original document ejection tray 12 is a tray onto which the original document D after reading is ejected. The paper feed roller 13 is arranged on the most upstream side of the original document transport path 10, and feeds the original document D set on the original document set tray 11 to the original document transport path 10. A plurality of transport roller pairs 14 are arranged in the transport path of the original document D, and transport the original document D along the original document transport path 10. The original document D transported by the transport roller pairs 14 along the original document transport path 10 is passed through the reading position RP and is finally ejected onto the original document ejection tray 12.

The white reference plate 15 is provided for acquiring white reference data used in shading correction. The white reference plate 15 is provided halfway through the transport path of the original document D, and is placed opposite the contact glass 20a (is arranged in the reading position RP) by the closing of the original document transport unit 1. Then, when the white reference data is acquired, the white reference plate 15 is read by the image reading portion 2 in a state where the original document D is not transported. At the time of the transport and reading, the original document D which is being transported in the reading position RP is guided by the white reference plate 15.

In the original document transport unit 1, an original document detection sensor DS for detecting the state of the transport of the original document D in the original document transport path 10 is provided. The number of original document detection sensors DS that are set is not particularly limited, and the position in which the original document detection sensor DS is provided is not particularly limited. For example, the original document detection sensor DS is arranged on the downstream side in an original document transport direction with respect to the paper feed roller 13.

The original document detection sensor DS is, for example, a transmission-type optical sensor that has a light emission portion and a light reception portion, and an actuator that protrudes inwardly of the original document transport path 10 is a detection target. When the end of the original document D reaches a detection position (the position in which the actuator protrudes), the actuator serving as the detection target is rotated by being pressed by the original document D. Then, when the back end of the original document D has been passed through the detection position, the pressing of the actuator by the original document D is cancelled, and thus the actuator is rotated in the opposite direction and is returned to the original position. Hence, the original document detection sensor DS changes an output value depending on whether or not the original document D is present in the detection position.

The image reading portion 2 includes a light source 21, an image sensor 22, a mirror 23 and a lens 24, and optically reads the original document D. The individual members of the image reading portion 2 are arranged within the frame of the image reading portion 2.

The light source 21 includes a plurality of LED elements and generates light applied to the original document D. Although not shown in the figure, the LED elements are aligned linearly in a main scanning direction. At the time of the transport and reading, the light source 21 applies light to the contact glass 20a (the light passing through the contact glass 20a is applied to the original document D). On the other hand, at the time of the placement and reading, the light source 21 applies light to the contact glass 20b (the light passing through the contact glass 20b is applied to the original document D). The light reflected off the original document D is reflected off the mirror 23 and is guided to the lens 24. The lens 24 collects the reflected light.

The image sensor 22 receives the light reflected off the original document D (the light collected by the lens 24) and thereby reads the original document D on a line-by-line basis. The image sensor 22 is formed with a CCD that has a plurality of photoelectric conversion elements aligned linearly in the main scanning direction, and when the image sensor 22 receives the reflected light, the image sensor 22 performs photoelectric conversion on a line-by-line basis for each pixel to store charge. Then, the image sensor 22 outputs an analog signal corresponding to the stored charge. In other words, the analogue output of the image sensor 22 per pixel is changed according to the amount of reflected light.

The light source 21 and the mirror 23 are attached to a movement frame 25 that can be moved in a sub-scanning direction perpendicularly intersecting the main scanning direction. The movement frame 25 is coupled to one end of a wire 26. The other end of the wire 26 is coupled to a winding drum 27. In this way, the winding drum 27 is rotated, and thus the movement frame 25 is moved in the sub-scanning direction. In other words, the light source 21 is moved in the sub-scanning direction.

At the time of the transport and reading, the movement frame 25 (the light source 21) is stopped below the contact glass 20a. Here, the light source 21 is arranged (in the position shown in FIG. 2) on the downstream side in the original document transport direction with respect to the reading position RP. Then, the light source 21 applies light to the original document D which is passed on the contact glass 20a. The image sensor 22 continuously and repeatedly performs the photoelectric conversion on the light reflected off the original document D. In this way, the original document D is read on a line-by-line basis.

At the time of the placement and reading, the movement frame 25 (the light source 21) is moved from left to right when seen from the front of the apparatus. Then, while the light source 21 is being moved in the sub-scanning direction, the light source 21 applies light to the original document D placed on the contact glass 20b. Here, the image sensor 22 continuously and repeatedly performs the photoelectric conversion on the light reflected off the original document D. In this way, the original document D is read on a line-by-line basis.

With reference back to FIG. 1, the print portion 3 is formed with the paper feed portion 4, the sheet transport portion 5, the image formation portion 6 and the fixing portion 7. The print portion 3 transports a sheet P along a sheet transport path 30, prints, to the sheet P, an image based on, for example, the image data of the original document D obtained through the reading of the original document D by the image reading portion 2 and outputs the sheet P.

The paper feed portion 4 feeds sheets P stored in a sheet cassette 41 to the sheet transport path 30. The paper feed portion 4 includes a pickup roller 42 and a paper feed roller pair 43. The pickup roller 42 feeds the sheet P stored in the sheet cassette 41 to the paper feed nip of the paper feed roller pair 43, and the paper feed roller pair 43 feeds the sheet P entering the paper feed nip to the sheet transport path 30.

The sheet transport portion 5 transports the sheet P fed to the sheet transport path 30 to a transfer nip and a fixing nip in this order, and ejects the sheet P to an ejection tray 51. The sheet transport portion 5 includes a plurality of transport roller pairs 52 arranged along the sheet transport path 30.

The image formation portion 6 forms a toner image based on the image data, and transfers the toner image to the sheet P. The image formation portion 6 includes a photosensitive drum 61, a charging device 62, an exposure device 63, a development device 64, a transfer roller 65 and a cleaning device 66.

At the time of image formation, the photosensitive drum 61 is rotated, and the charging device 62 charges the surface of the photosensitive drum 61 such that the surface has a predetermined potential. The exposure device 63 scans and exposes the surface of the photosensitive drum 61 to form an electrostatic latent image on the surface of the photosensitive drum 61. The development device 64 feeds the toner to the electrostatic latent image formed on the surface of the photosensitive drum 61 and develops it.

The transfer roller 65 is pressed onto the surface of the photosensitive drum 61 to form the transfer nip with the photosensitive drum 61. In this way, when the sheet P enters the transfer nip, the toner image on the surface of the photosensitive drum 61 is transferred to the sheet P. When the transfer of the toner image to the sheet P is completed, the cleaning device 66 removes the toner and the like left on the surface of the photosensitive drum 61.

The fixing portion 7 heats and pressurizes the toner image transferred to the sheet P to fix the toner image. The fixing portion 7 includes a heating roller 71 and a pressure roller 72. The heating roller 71 incorporates a heating source. The pressure roller 72 is pressed onto the heating roller 71 to form the fixing nip with the heating roller 71. Then, the sheet P to which the toner image is transferred is heated and pressurized by being passed through the fixing nip.

The operation panel 8 receives an input of a setting value on a job, and receives a start operation for starting a job. The operation panel 8 includes a liquid crystal display portion 81 with a touch panel. The liquid crystal display portion 81 displays a soft key, a message and the like for receiving an input of a setting value on a job. In the operation panel 8, hard keys 82 such as a start key and a numeric keypad are also provided.

<Hardware Configuration of Multifunctional Machine>

Figure 3:
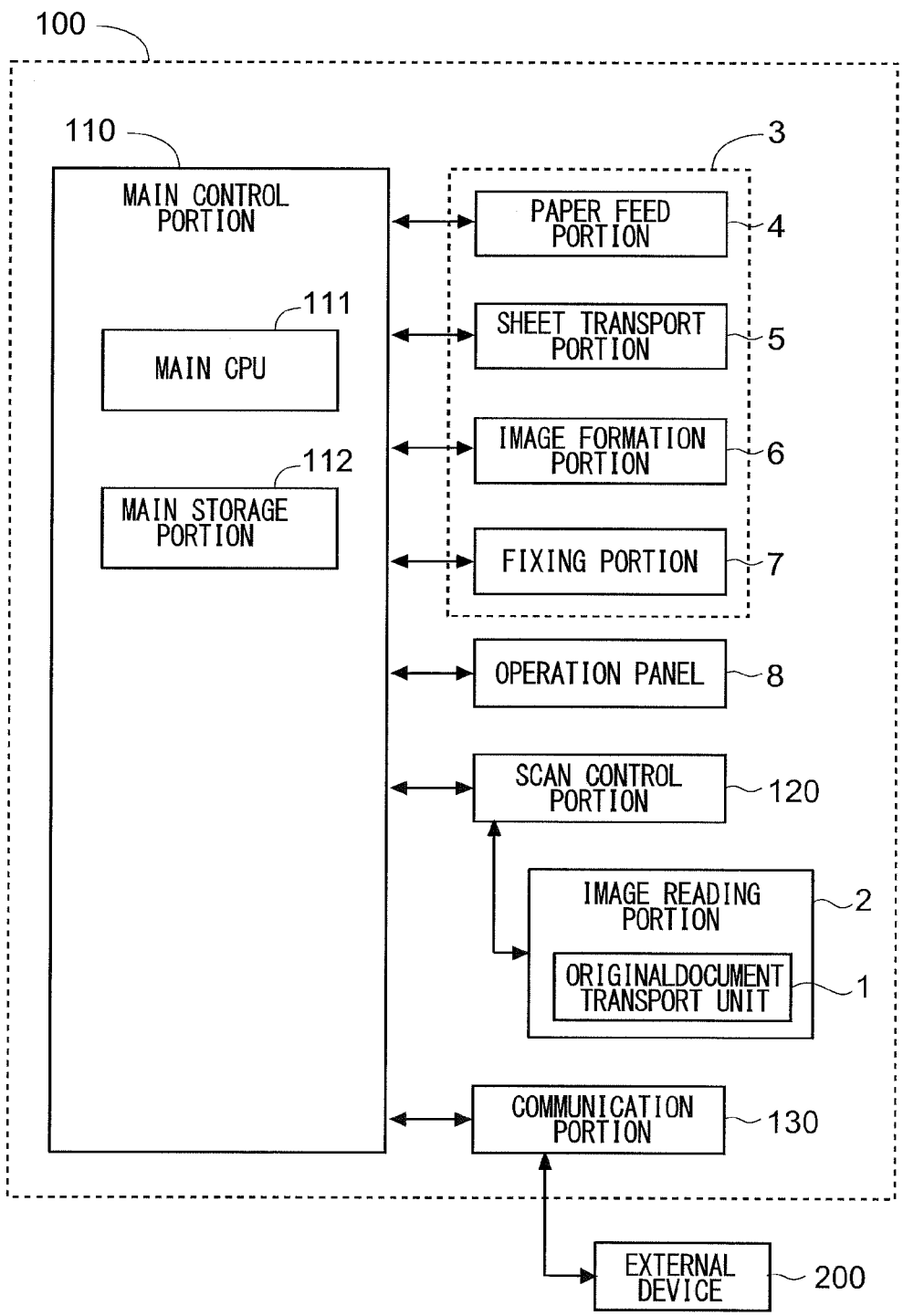
FIG. 3 is a block diagram showing the hardware configuration of the multifunctional machine in the embodiment of the present disclosure.

As shown in FIG. 3, the multifunctional machine 100 includes a main control portion 110. The main control portion 110 includes a main CPU 111 and a main storage portion 112. The main storage portion 112 stores a control program and data. The main control portion 110 controls the entire multifunctional machine 100 based on the control program and data.

Figure 4:
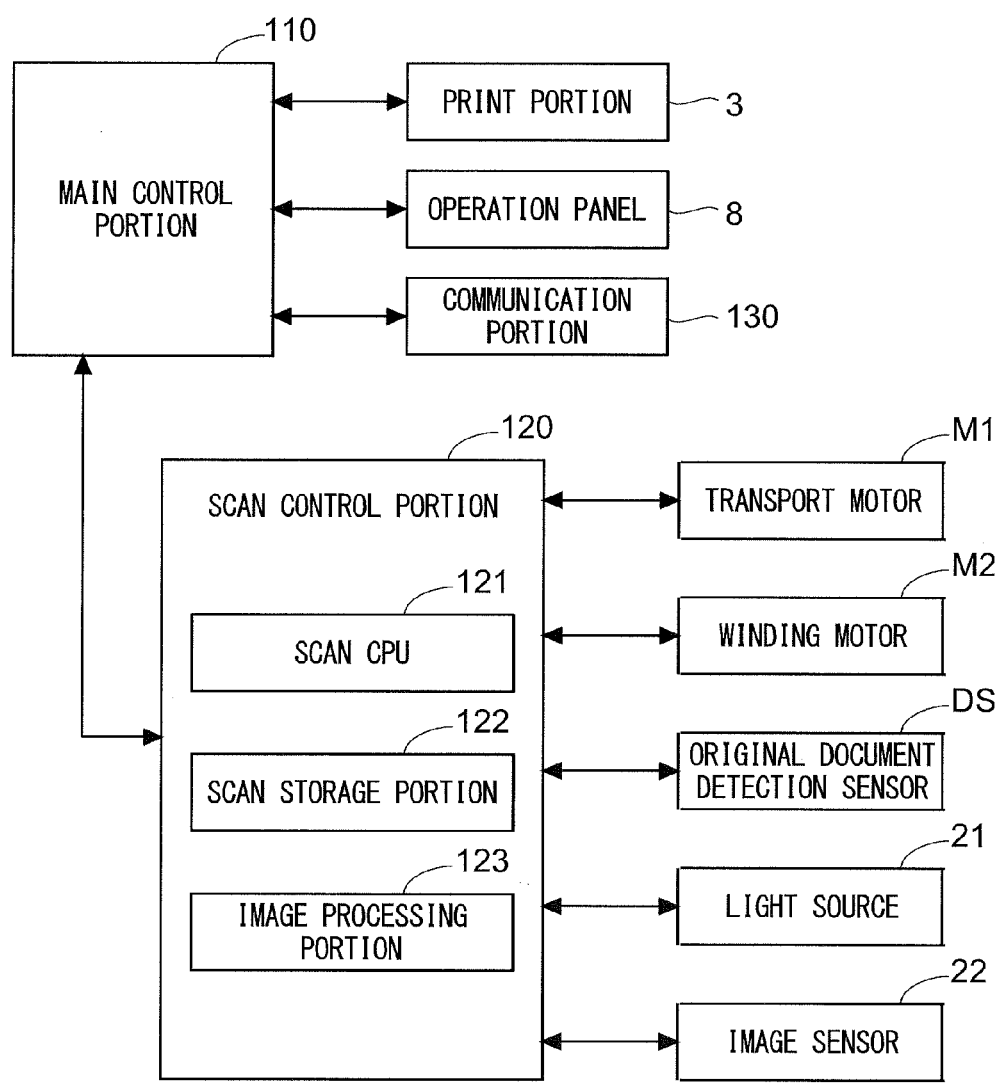
FIG. 4 is a block diagram showing the hardware configuration of the image reading portion of the multifunctional machine in the embodiment of the present disclosure.

A scan control portion 120 is connected to the main control portion 110. As shown in FIG. 4, the scan control portion 120 includes a scan CPU 121, a scan storage portion 122 and an image processing portion 123. The scan control portion 120 receives an instruction from the main control portion 110 to control the original document transport operation of the original document transport unit 1 and the image reading operation of the image reading portion 2.

Specifically, the scan control portion 120 is connected to a transport motor M1 for rotating the paper feed roller 13 and the transport roller pairs 14, and appropriately rotates the paper feed roller 13 and the transport roller pairs 14. The scan control portion 120 is also connected to a winding motor M2 for rotating the winding drum 27, and appropriately rotates the winding drum 27. In other words, the scan control portion 120 appropriately moves the movement frame 25 (the light source 21) in the sub-scanning direction. Furthermore, the light source 21 and the image sensor 22 are also connected to the scan control portion 120. Then, the scan control portion 120 controls the operations of the light source 21 and the image sensor 22.

The image processing portion 123 of the scan control portion 120 includes an amplification circuit and an A/D conversion circuit, amplifies the image data (the analogue output of the image sensor 22) obtained by reading the original document D and converts it into digital image data. The image processing portion 123 performs the shading correction, black stripe removal processing which will be described later and the like, and outputs the processed image data to the main control portion 110. Then, when the main control portion 110 receives the image data from the scan control portion 120, the main control portion 110 generates, for example, exposure image data (data for controlling the exposure by the exposure device 63).

The scan control portion 120 is connected to the original document detection sensor DS. Based on the output value of the original document detection sensor DS, the scan control portion 120 detects whether or not a jam occurs and measures timing at which the original document D is transported and timing at which the original document D is read.

For example, when a predetermined time elapses since it is detected that the end of the original document D reaches the detection position of the original document detection sensor DS, the scan control portion 120 starts the reading of the original document D by the image reading portion 2. The predetermined time refers to a scheduled time that elapses since the end of the original document D reaches the detection position of the original document detection sensor DS until the end reaches the reading position PR, and the predetermined time is determined based on a transport distance from the detection position of the original document detection sensor DS to the reading position RP and a transport speed.

The scan control portion 120 also detects the length of the original document D in the transport direction based on a time that elapses since it is detected that the end of the original document D reaches the detection position of the original document detection sensor DS until the detection of the back end (the time that reaches a level at which the output value of the original document detection sensor DS indicates the presence of the original document D). Then, the scan control portion 120 completes the reading of the original document D by the image reading portion 2 with timing at which the back end of the original document D is passed through the reading position RP.

With reference back to FIG. 3, a communication portion 130 is connected to the main control portion 110. The communication portion 130 is connected to an external device 200 such as a personal computer or a facsimile such that the communication portion 130 can communicate with the external device 200. The communication portion 130 receives an instruction from the main control portion 110 to exchange data with the external device 200.

The main control portion 110 is connected to the operation panel 8. The main control portion 110 controls the display operation of the operation panel 8 and detects an operation performed on the operation panel 8.

<Black Stripe Removal Processing>

Figure 5:
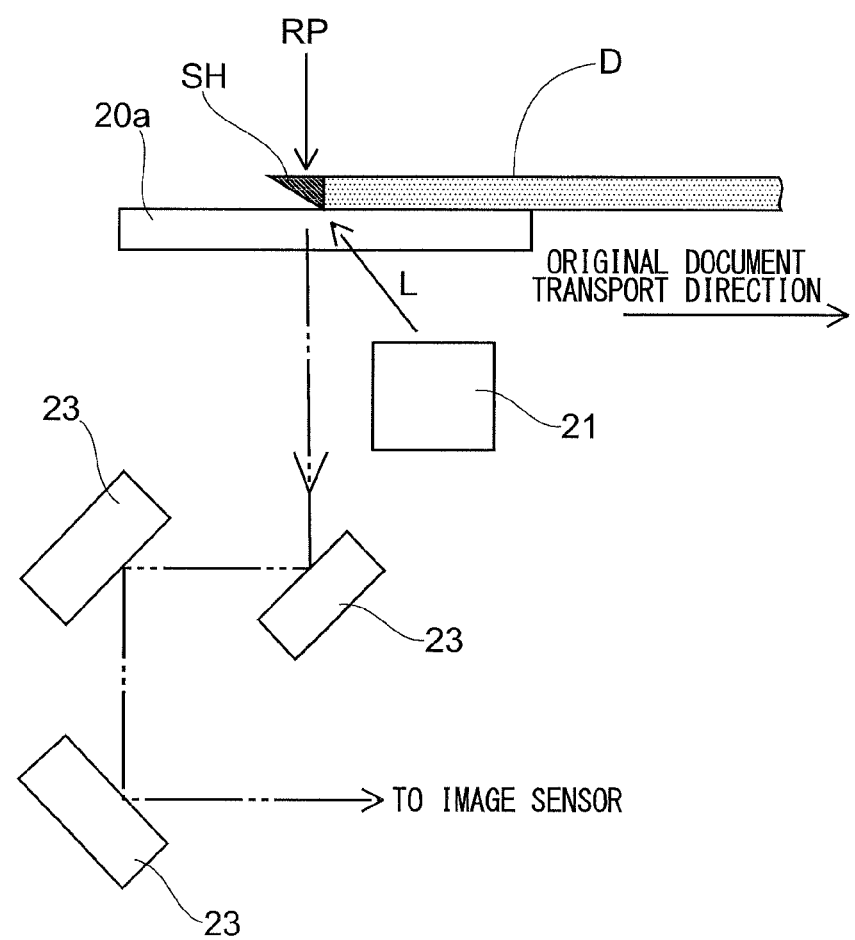
FIG. 5 is a diagram for illustrating the cause in which a black stripe appears in the image data of an original document obtained by reading the original document.
Figure 6:
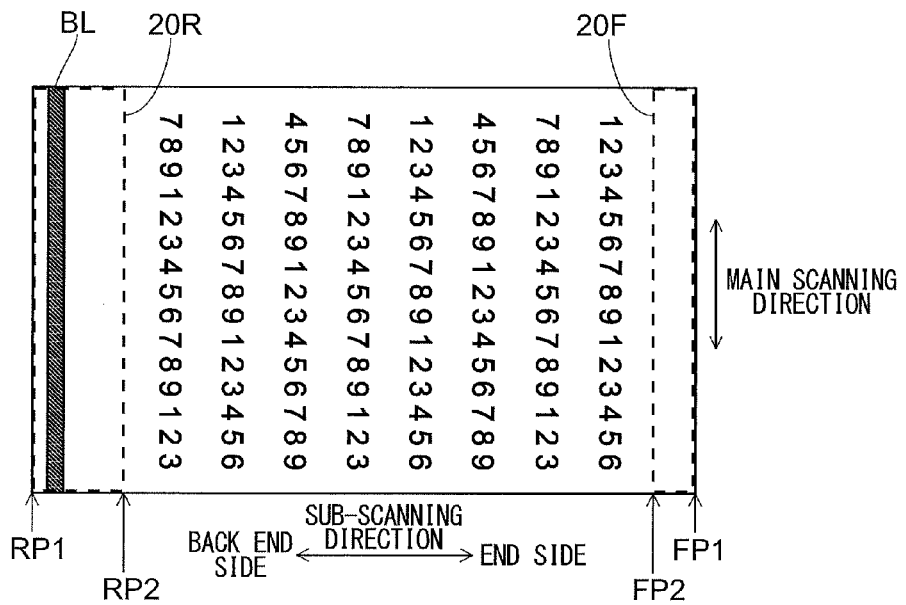
FIG. 6 is a diagram showing an example of reading image data (the image data in which the black stripe appears) generated by the multifunctional machine according to the embodiment of the present disclosure.

As shown in FIG. 5, when the transport and reading are performed by the image reading portion 2, the light source 21 is arranged on the downstream side in the original document transport direction with respect to the reading position RP (the light source 21 is not arranged on the upstream side in the original document transport direction with respect to the reading position RP). Hence, when the timing at which the reading is completed is delayed, the light from the light source 21 is interrupted by the back end of the original document D, and thus a shadow SH produced on the side of the back end of the original document D is read by the image reading portion 2. Consequently, as shown in FIG. 6, in the image data (hereinafter simply referred to as reading image data) obtained through the reading of the original document D by the image reading portion 2, a black stripe BL extending in the main scanning direction appears.

For example, when the responsiveness of the original document detection sensor DS is poor, it is impossible to accurately detect the length of the original document D in the transport direction. Hence, the timing at which the reading is completed may be delayed as compared with the timing at which the back end of the original document D is actually passed through the reading position RP. Such a timing displacement is produced such as when the roller diameter of the transport roller pair 14 and the rotation speed of the transport motor M1 are larger than design values (when the transport speed is higher than the design value).

Hence, in the present embodiment, the black stripe removal processing for removing the black stripe BL can be performed. The black stripe removal processing is performed by the image processing portion 123 for each page.

Specifically, when the reading of one page is completed, the image processing portion 123 determines whether or not the black stripe BL is present in the reading image data. In order to make such a determination, the image processing portion 123 sets a first threshold density for determining whether or not the black stripe BL is present.

When the image processing portion 123 sets the first threshold density, a range from the tip end position FP1 of the reading image data in the sub-scanning direction to a predetermined end side position FP2 is set as an end side range 20F (see FIG. 6). Although not particularly limited, for example, a range that extends by 2 mm toward the side of the back end from the tip end position FP1 in the sub-scanning direction is set at the end side range 20F. The part of the original document D corresponding to the end side range 20F may often be normally a margin. Hence, it can be said that the end side range 20F is the part corresponding to the margin on the side of the end of the original document D.

Figure 7:
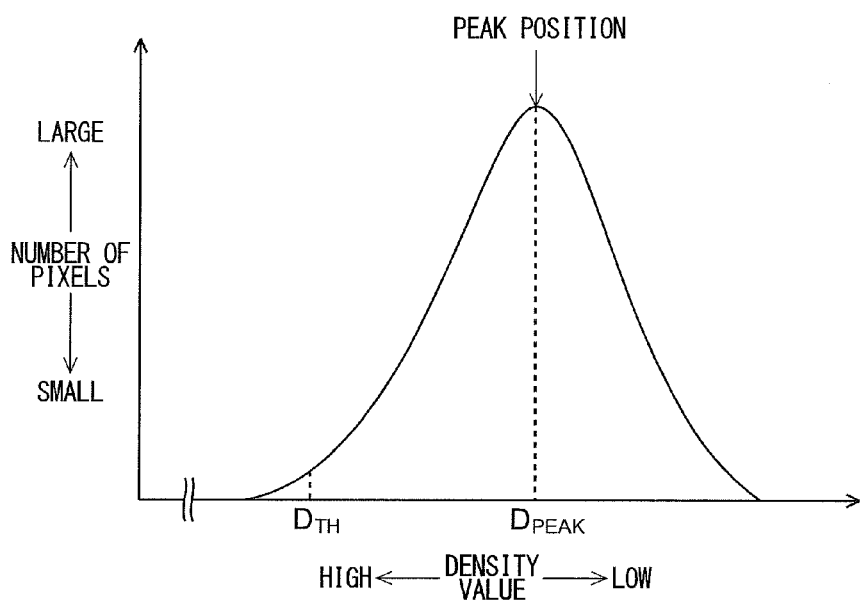
FIG. 7 is a diagram showing an example of an end side density histogram generated by the multifunctional machine according to the embodiment of the present disclosure.

When the image processing portion 123 sets the end side range 20F, the image processing portion 123 generates, based on the image data of the end side range 20F, an end side density histogram (see FIG. 7) that indicates the number of pixels for each density value. Thereafter, the image processing portion 123 sets a density value a predetermined value or more higher than the density value of the peak position of the end side density histogram at the first threshold density. Specifically, the image processing portion 123 sets the first threshold density such that a proportion of the number of pixels whose density value is higher than the first threshold density in the total number of pixels within the end side range 20F is a predetermined proportion (for example, 5% or less). In FIG. 7, the density of the peak position is represented by "$D_{PEAK}$" and the first threshold density is represented by "$D_{TH}$".

The image processing portion 123 also sets a range from the last back end position RP1 (that is, the position of the final main scanning line among the main scanning lines corresponding to one page) of the reading image data in the sub-scanning direction to a predetermined back end side position RP2 at a back end side range 20R (see FIG. 6). Although not particularly limited, for example, a range that extends by 5 mm toward the side of the end from the last back end position RP1 in the sub-scanning direction is set at the back end side range 20R.

When a main scanning line in which the density value of a pixel in a predetermined position is higher than the first threshold density is present among a plurality of main scanning lines on the side of the back end included in the back end side range 20R, the image processing portion 123 determines that the black stripe BL is present in the reading image data.

When the image processing portion 123 determines that the black stripe BL is present in the reading image data, among the main scanning lines within the back end side range 20R in which the density value of the pixel in the predetermined position is higher than the first threshold density, the main scanning line farthest from the last back end position RP1 in the sub-scanning direction is set at a reference line. Then, the image processing portion 123 performs, as the black stripe removal processing, processing for replacing, with a density value corresponding to white, the density values of all pixels included in a range from the position of the reference line in the sub-scanning direction to the last back end position RP1.

In this way, the black stripe BL is removed from the reading image data. Hence, in images (such as an image printed on the sheet P and an image displayed on the external device 200) that are output based on the reading image data, an image (black stripe image corresponding to the black stripe BL) of a shadow produced on the side of the back end of the original document D does not appear.

For example, the image processing portion 123 performs density detection for detecting whether or not the density value of the pixel in the predetermined position is higher than the first threshold density line by line in a direction extending from the main scanning line (that is, the main scanning line present in the predetermined position RP2) farthest from the last back end position RP1 in the sub-scanning direction toward the last back end position RP1. Then, when the image processing portion 123 first detects that the density value of the pixel in the predetermined position is higher than the first threshold density, the main scanning line whose density is a target to be detected at that time is set at the reference line.

When a shadow produced on the side of the back end of the original document D is read by the image reading portion 2, the black stripe BL appears so as to extend from a pixel on one end (the tip end pixel) in the main scanning direction to a pixel on the other end (the last back end pixel). In other words, the density value of each of the pixel on one end in the main scanning direction and the pixel on the other end is higher than the first threshold density. Hence, when the image processing portion 123 sequentially performs the density detection on a plurality of main scanning lines included in the back end side range 20R, the pixels located between the pixels at both ends in the main scanning direction are not set at the targets to be detected, and only the pixels located at both ends in the main scanning direction are set at the targets to be detected.

When the image processing portion 123 detects the main scanning line that needs to be set at the reference line, the density detection is completed at that time. In other words, when the image processing portion 123 detects the main scanning line that needs to be set at the reference line, even if the main scanning lines whose density is not detected are left within the back end side range 20R, the density detection is not performed on the remaining main scanning lines.

In a case where the background density of the original document D is low, when the black stripe image (the image of a shadow produced on the side of the back end of the original document D) corresponding to the black stripe BL is output, since the black stripe image is highlighted, the black stripe image becomes conspicuous. However, in a case where the background density of the original document D is high, even when the black stripe image is output, the black stripe image becomes conspicuous only slightly. Hence, in a case where the background density of the original document D is high, it is not always necessary to perform the black stripe removal processing. Thus, the image processing portion 123 determines, based on the background density of the original document D, whether or not the black stripe removal processing is performed. Although not particularly limited, this determination is made by a first method or a second method that will be described later.

In the first method, when the reading of one page is completed, the image processing portion 123 compares the density value (see FIG. 7) of the peak position of the end side density histogram with a predetermined second threshold density. When as a result, the density value of the peak position of the end side density histogram is higher than the second threshold density, the image processing portion 123 determines that the conditions (hereinafter referred to as processing performance conditions) in which the black stripe removal processing is performed are not satisfied, and thereby does not perform the black stripe removal processing.

When the second threshold density is set, for example, the original document D is read such that the black stripe BL intentionally appears, and thus the density value of the black stripe BL is acquired. Then, a density value lower than the density value of the black stripe BL is set at the second threshold density. As an example, in the case of 8-bit gradations (256 gradations), a density value that is 20 gradations lower than the density value of the black stripe BL is set at the second threshold density. The second threshold density set in this way is stored in the scan storage portion 122.

In the second method, the image processing portion 123 generates, based on the image data of the white reference plate 15, a white plate density histogram indicating the number of pixels for each density value. The image data of the white reference plate 15 is generated through the reading of the white reference plate 15 by the image reading portion 2 at a predetermined time such as when power is turned on.

Then, when the reading of one page is completed, the image processing portion 123 compares the density value (see FIG. 7) of the peak position of the end side density histogram with the density value of the peak position of the white plate density histogram. When as a result, the density value of the peak position of the end side density histogram is a predetermined value or more higher than the density value of the peak position of the white plate density histogram, the image processing portion 123 determines that the processing performance conditions are not satisfied, and thereby does not perform the black stripe removal processing. As an example, in the case of 8-bit gradations (256 gradations), the image processing portion 123 determines that the processing performance conditions are not satisfied when the density value of the peak position of the end side density histogram is higher than the density value of the white plate density histogram and the gradation difference between the density values of the peak positions is 170 or more.

Figure 8:
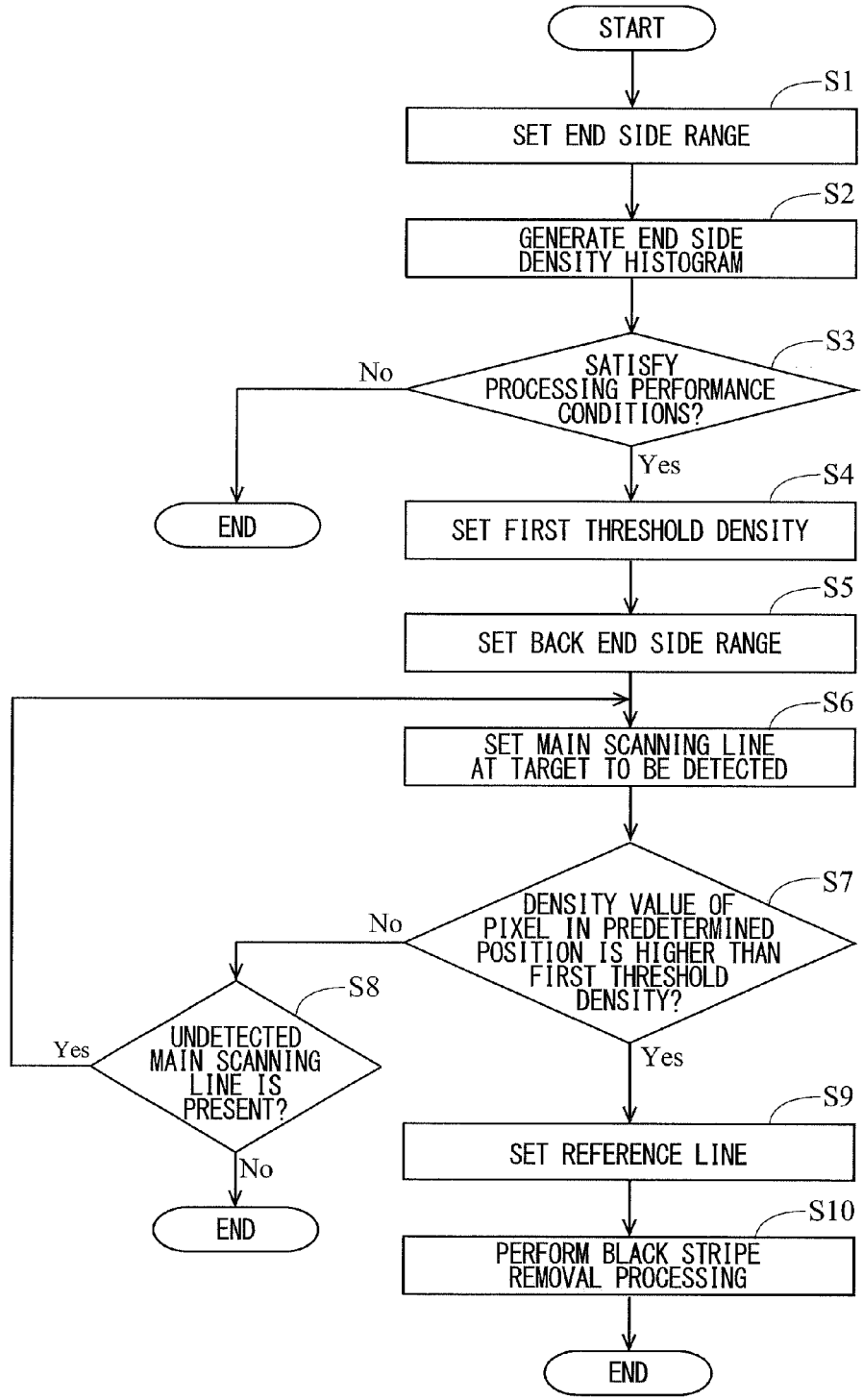
FIG. 8 is a flowchart for illustrating the flow of control when black stripe removal processing is performed by the multifunctional machine according to the embodiment of the present disclosure.

The flow of control when the black stripe removal processing is performed will be described below with reference to a flowchart shown in FIG. 8. The flowchart shown in FIG. 8 is started when the reading image data corresponding to one page is generated.

In step S1, the image processing portion 123 sets the range from the tip end position FP1 of the reading image data in the sub-scanning direction to the predetermined position FP2 at the end side range 20F. In step S2, the image processing portion 123 generates, based on the image data of the end side range 20F, the end side density histogram indicating the number of pixels for each density value. Here, the image processing portion 123 determines the density value of the peak position of the end side density histogram.

Then, in step S3, the image processing portion 123 determines, based on the density value of the peak position of the end side density histogram, whether or not the processing performance conditions (the conditions that are previously determined as the conditions in which the black stripe removal processing is performed). When as a result, the processing performance conditions are satisfied, the process is moved to step S4 whereas when the processing performance conditions are not satisfied, the present flow is completed.

When the process is moved to step S4, the image processing portion 123 sets the first threshold density based on the end side density histogram. In step S5, the image processing portion 123 sets the range from the last back end position RP1 of the reading image data in the sub-scanning direction to the predetermined position RP2 at the back end side range 20R. Then, in step S6, the image processing portion 123 sets the main scanning line whose density is a target to be detected among a plurality of main scanning lines included in the back end side range 20R.

Then, in step S7, the image processing portion 123 detects, on the main scanning line set at a target to be detected, whether or not the density value of the pixel in the predetermined position is higher than the first threshold density. When as a result, the density value of the pixel in the predetermined position is not higher than the first threshold density, the process is moved to step S8.

When the process is moved to step S8, the image processing portion 123 determines whether or not an undetected main scanning line whose density is not detected is present within the back end side range 20R. When as a result, an undetected main scanning line is not present, the present flow is completed.

In step S8, when the image processing portion 123 determines that an undetected main scanning line is present, the process is returned to step S6. When the process is returned from step S8 to step S6, the image processing portion 123 newly sets a main scanning line whose density is a target to be detected. Here, the image processing portion 123 sets, at a new target to be detected, a main scanning line that is displaced by one line toward the last back end position RP1 in the sub-scanning direction with respect to the main scanning line that was set at the target to be detected immediately before.

Thereafter, each time the process is returned from step S8 to step S6, a main scanning line that is displaced by one line toward the last back end position RP1 in the sub-scanning direction with respect to the main scanning line that was set at the target to be detected immediately before is set at a new target to be detected, and the density detection in step S7 is repeated. Then, in step S7, when the image processing portion 123 detects that the density value of the pixel in the predetermined position is higher than the first threshold density, the process is moved to step S9.

When the process is moved to step S9, the image processing portion 123 sets, at the reference line, the main scanning line set at the target to be detected in step S7. Then, in step S10, the image processing portion 123 performs the black stripe removal processing. Specifically, the image processing portion 123 replaces the density values of all pixels included in the range from the position of the reference line in the sub-scanning direction to the last back end position RP1 with the density value corresponding to white.

In the multifunctional machine 100 of the present embodiment, as described above, when a shadow produced on the side of the back end of the original document D is read, if the black stripe BL appearing in the reading image data is present, the black stripe removal processing is performed. When the black stripe removal processing is performed, the density value of the pixel forming the black stripe BL is replaced with the density value corresponding to white. In other words, the black stripe BL is removed from the reading image data. In this way, it is possible to reduce the output of the black stripe image (the image of a shadow produced on the side of the back end of the original document D) corresponding to the black stripe BL.

In the present embodiment, as described above, the image processing portion 123 detects whether or not the density value of the pixel in the predetermined position is higher than the first threshold density line by line in a direction extending from the main scanning line (the main scanning line present in the predetermined position RP2) farthest from the last back end position RP1 in the sub-scanning direction toward the last back end position RP1. Then, when the image processing portion 123 first detects that the density value of the pixel in the predetermined position is higher than the first threshold density, the main scanning line whose density is a target to be detected is set at the reference line, and the black stripe removal processing is performed. In this configuration, when the main scanning line in which the density value of the pixel in the predetermined position is higher than the first threshold density is first detected, even if an undetected main scanning line is left, it is not necessary to detect whether or not on the main scanning line, the density value of the pixel in the predetermined position is higher than the first threshold density.

In the present embodiment, as described above, the pixel (the image in which whether or not the density value is higher than the first threshold density is detected) in the predetermined position is set at pixels located at both ends in the main scanning direction. Here, when a shadow produced on the side of the back end of the original document D is read, the black stripe BL appears so as to extend from a pixel on one end (the tip end pixel) in the main scanning direction to a pixel on the other end (the last back end pixel). Parts of the original document D at both ends in the main scanning direction are normally margins (parts where no image is present). Hence, when the density values of pixels located at both ends of a main scanning line within the back end side range 20R in the main scanning direction are higher than the first threshold density, it can be said that the main scanning line is a line forming the black stripe BL. Therefore, the pixels located at both ends in the main scanning direction are set at targets to be detected, and thus it is possible to reliably determine whether or not the black stripe BL is present.

In the present embodiment, as described above, the image processing portion 123 generates, based on the image data of the end side range 20F from the tip end position FP1 of the reading image data in the sub-scanning direction to the predetermined position FP2, the end side density histogram (see FIG. 7) indicating the number of pixels for each density value. Then, the image processing portion 123 sets the first threshold density such that a proportion of the number of pixels whose density value is higher than the first threshold density in the total number of pixels within the end side range 20F is a predetermined proportion.

Here, as shown in FIG. 7, variations in the density value (that is, the background density of the original document D) of the end side range 20F are produced, and a large number of pixels whose density is slightly higher (for example, whose density is one to two stages higher) than the density value of the peak position of the end side density histogram are present. Hence, for example, the density value of the pixel (the image in which whether or not the density value is higher than the first threshold density is detected) in the predetermined position of a main scanning line within the back end side range 20R may be only one to two stages higher than the density value of the peak position. In this case, when the density value of the peak position of the end side density histogram is set at the first threshold density, though the black stripe BL does not appear in the reading image data, it is disadvantageously determined that the black stripe BL is present when the main scanning line is detected. In order for the occurrence of such a problem to be reduced, a density value that is a predetermined value or more higher than the density value of the peak position of the end side density histogram is preferably set at the first threshold density.

In the present embodiment, as described above, when the density value of the peak position of the end side density histogram is higher than the second threshold density, the image processing portion 123 does not perform the black stripe removal processing. Alternatively, the image processing portion 123 generates, based on the image data of the white reference plate 15 obtained through the reading of the white reference plate 15 (white plate) by the image reading portion 2, a white plate density histogram indicating the number of pixels for each density value. Then, when the density value of the peak position of the end side density histogram is a predetermined value or more higher than the density value of the peak position of the white plate density histogram, the image processing portion 123 does not perform the black stripe removal processing. In other words, even though the black stripe image is output, when the black stripe image is only slightly conspicuous, the image processing portion 123 does not perform the black stripe removal processing. In this way, since the image processing performed when the original document D is read is reduced because the black stripe removal processing is not performed, it is possible to reduce a decrease in the processing speed of the image processing. Although in the present embodiment, the white plate for guiding the original document D which is passed through the reading position RP also serves as the white reference plate for shading correction, the white reference plate for shading correction and the white plate may be provided separately.

It should be considered that the embodiment disclosed herein is illustrative in all respects and not restrictive. The scope of the present disclosure is indicated not by the description of the embodiment but by the scope of claims, and furthermore, meanings equivalent to the scope of claims and all modifications within the range are included.

What is claimed is:

1. An image reading device comprising:
an original document transport unit that transports an original document to a reading position in which the original document is read;
an image reading portion that includes a light source which is arranged on a downstream side in an original document transport direction with respect to the reading position when the original document is read in the reading position, that applies light of the light source to the original document transported to the reading position and that photoelectrically converts light reflected off the original document to generate image data of the original document; and an image processing portion that performs image processing on reading image data which is the image data of the original document obtained through reading of the original document by the image reading portion, wherein the image processing portion determines that a black stripe that appears when a shadow produced on a side of a back end of the original document transported to the reading position is read by the image reading portion in the reading image data is present when among a plurality of main scanning lines included in a back end side range from a last back end position of the reading image data in a sub-scanning direction to a predetermined back end side position, a main scanning line in which a density value of a pixels in a predetermined position is higher than a first threshold density is present, and when the image processing portion determines that the black stripe is present in the reading image data, the image processing portion sets, at a reference line, a main scanning line farthest from the last back end position among the main scanning lines within the back end side range in which the density value of the pixel in the predetermined position is higher than the first threshold density, and performs black stripe removal processing which replaces density values of all pixels included in a range from a position of the reference line in the sub-scanning direction to the last back end position with a density value corresponding to white.

2. The image reading device according to claim 1, wherein the image processing portion detects, line by line, in a direction extending from the main scanning line farthest from the last back end position among the main scanning lines included in the back end side range toward the last back end position, whether or not the density value of the pixel in the predetermined position is higher than the first threshold density, and when the image processing portion first detects that the density value of the pixel in the predetermined position is higher than the first threshold density, the image processing portion sets, at the reference line, the main scanning line which is a target to be detected, and performs the black stripe removal processing.

3. The image reading device according to claim 2, wherein even when the image processing portion first detects a main scanning line in which the density value of the pixel in the predetermined position is higher than the first threshold density and a main scanning line in which density detection is not performed is left within the back end side range, the image processing portion does not detect, on the remaining main scanning line, whether or not the density value of the pixel in the predetermined position is higher than the first threshold density.

4. The image reading device according to claim 1, wherein the pixel in the predetermined position is pixels located at both ends in a main scanning direction.

5. The image reading device according to claim 1, wherein the image processing portion generates, based on image data of an end side range from a tip end position of the reading image data in the sub-scanning direction to a predetermined end side position, an end side density histogram indicating a number of pixels for each density value, and the image processing portion sets the first threshold density such that the first threshold density is higher than a density value of a peak position of the end side density histogram and that a proportion of a number of pixels whose density value is higher than the first threshold density in a total number of pixels within the end side range is a predetermined proportion.

6. The image reading device according to claim 5, wherein the image processing portion does not perform the black stripe removal processing when the density value of the peak position of the end side density histogram is higher than a predetermined second threshold density.

7. The image reading device according to claim 5, wherein the original document transport unit includes a white plate arranged in the reading position, the image processing portion generates, based on image data of the white plate obtained through reading of the white plate by the image reading portion, a white plate density histogram indicting a number of pixels for each density value and the image processing portion does not perform the black stripe removal processing when the density value of the peak position of the end side density histogram is a predetermined value or more higher than a density value of a peak position of the white plate density histogram.

8. An image forming apparatus comprising the image reading device of claim 1.

* * * * *